US012389343B2

(12) United States Patent
Liu

(10) Patent No.: US 12,389,343 B2
(45) Date of Patent: Aug. 12, 2025

(54) TRANSMIT POWER CONFIGURATION METHOD, IAB NODE, BASE STATION, AND STORAGE MEDIUM

(71) Applicant: VIVO MOBILE COMMUNICATION CO., LTD., Guangdong (CN)

(72) Inventor: Jinhua Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 472 days.

(21) Appl. No.: 17/847,288

(22) Filed: Jun. 23, 2022

(65) Prior Publication Data

US 2022/0322249 A1 Oct. 6, 2022

Related U.S. Application Data

(63) Continuation of application No. PCT/CN2021/072672, filed on Jan. 19, 2021.

(30) Foreign Application Priority Data

Jan. 23, 2020 (CN) .......................... 202010076424.1

(51) Int. Cl.
*H04W 52/36* (2009.01)
(52) U.S. Cl.
CPC ....... *H04W 52/367* (2013.01); *H04W 52/365* (2013.01)
(58) Field of Classification Search
CPC ............. H04W 52/367; H04W 52/365; H04W 52/242; H04W 52/281; H04W 72/04;
(Continued)

(56) References Cited

U.S. PATENT DOCUMENTS 10,470,136 B1 11/2019 Ghoash et al.
11,252,718 B2 * 2/2022 Abedini ................ H04L 5/0094
(Continued)

FOREIGN PATENT DOCUMENTS

CN 110087296 A 8/2019
EP 4164315 A1 4/2023
(Continued)

OTHER PUBLICATIONS

AT&T, Enhancements to support NR backhaul links, 3GPP TSG RAN WG1 Meeting #94, R1-1809072, Aug. 20-24, 2018, Gothenburg, Sweden.
(Continued)

*Primary Examiner* — Ankur Jain
(74) *Attorney, Agent, or Firm* — Price Heneveld LLP

(57) ABSTRACT

Embodiments of this application disclose a transmit power configuration method, an IAB node, a base station, and a storage medium, and relate to the field of communications technologies. The method is applied to an integrated access and backhaul IAB node, and the IAB node includes a distributed unit DU and a mobile termination MT unit. The method includes: determining a first transmit power configuration for the DU and/or a second transmit power configuration for the MT unit; and controlling the DU to transmit information at a transmit power indicated by the first transmit power configuration, and/or the MT unit to transmit information at a transmit power indicated by the second transmit power configuration, where a sum of the transmit power of the DU and the transmit power of the MT unit is less than or equal to a maximum transmit power of the IAB node.

18 Claims, 5 Drawing Sheets

(58) Field of Classification Search
CPC ........... H04W 72/0473; H04W 52/346; H04W 52/46; H04W 72/0446; H04W 84/047
See application file for complete search history.

(56) References Cited

U.S. PATENT DOCUMENTS

| | | | |
|---|---|---|---|
| 11,856,527 B2* | 12/2023 | Bergljung | H04W 52/34 |
| 2012/0294172 A1 | 11/2012 | Adachi | |
| 2012/0322493 A1* | 12/2012 | Nikopour | H04W 52/146 455/522 |
| 2019/0132096 A1* | 5/2019 | Abedini | H04W 52/46 |
| 2019/0132805 A1 | 5/2019 | Abedini et al. | |
| 2019/0132807 A1 | 5/2019 | Abedini et al. | |
| 2019/0132847 A1* | 5/2019 | Abedini | H04W 52/38 |
| 2020/0336986 A1 | 10/2020 | Chen et al. | |
| 2021/0051579 A1 | 2/2021 | Luo et al. | |
| 2022/0015040 A1* | 1/2022 | Dortschy | H04W 52/16 |

FOREIGN PATENT DOCUMENTS

| | | |
|---|---|---|
| JP | 2012244213 A | 12/2012 |
| WO | 2019192524 A1 | 10/2019 |
| WO | 2020000203 A1 | 1/2020 |
| WO | 2021020350 A1 | 2/2021 |

OTHER PUBLICATIONS

Qualcomm Inc., "IAB Ad Hoc meeting minutes", 3GPP TSG-RAN WG4 #93, R4-1916161, Reno, United States, Nov. 18-22, 2019.
Ericsson, "IAB-MT Maximum TX power", 3GPP TSG-RAN4 Meeting #92bis, R4-1914219, Chongqing, China, Oct. 14-18, 2019.
AT&T, "Summary of 7.2.3.1 Enhancements to support NR backhaul links", 3GPP TSG RAN WGI Meeting #95, RI-1814127, Spokane, USA, Nov. 12-16, 2018.
CMCC, "Discussions on enhancements to support NR Backhaul links", 3GPP TSG RAN WGI Meeting #95, RI-1812878, Spokane, USA, Nov. 12-16, 2018.

* cited by examiner

TRANSMIT POWER CONFIGURATION METHOD, IAB NODE, BASE STATION, AND STORAGE MEDIUM

CROSS-REFERENCE TO RELATED APPLICATIONS

This application is a continuation application of PCT International Application No. PCT/CN2021/072672 filed on Jan. 19, 2021, which claims a priority to Chinese Patent Application No. 202010076424.1, filed on Jan. 23, 2020 and entitled "TRANSMIT POWER CONFIGURATION METHOD, IAB NODE, BASE STATION, AND STORAGE MEDIUM", which are incorporated herein by reference in their entireties.

TECHNICAL FIELD

Embodiments of this application relate to the communications field, and in particular, to a transmit power configuration method, an IAB node, a base station, and a storage medium.

BACKGROUND

An integrated access and backhaul (IAB) node includes a distributed unit (DU) and a mobile termination (MT) unit. Through the MT unit, an IAB node can establish a wireless connection to a DU of a parent IAB node, so as to establish a backhaul link of the IAB node.

With development and evolution of IAB technologies, an IAB node needs to support spatial multiplexing transmission or frequency division multiplexing transmission between a previous hop and a next hop. In a case where the IAB node has only one radio frequency unit, there may be a conflict between transmit powers of the DU and the MT unit, reducing communication performance of the IAB node.

SUMMARY

To resolve the foregoing technical problem, this application is implemented as follows:

According to a first aspect, an embodiment of this application provides a transmit power configuration method, applied to an integrated access and backhaul IAB node, where the IAB node includes a distributed unit DU and a mobile termination MT unit, and the method includes:

determining a first transmit power configuration for the DU and/or a second transmit power configuration for the MT unit; and controlling the DU to transmit information at a transmit power indicated by the first transmit power configuration, and/or the MT unit to transmit information at a transmit power indicated by the second transmit power configuration, where a sum of the transmit power of the DU and the transmit power of the MT unit is less than or equal to a maximum transmit power of the IAB node.

According to a second aspect, an embodiment of this application provides an integrated access and backhaul IAB node, where the IAB node includes a distributed unit DU and a mobile termination MT unit, and the IAB node further includes:

a power configuration determining module, configured to determine a first transmit power configuration for the DU and/or a second transmit power configuration for the MT unit; and a transmission control module, configured to control the DU to transmit information at a transmit power indicated by the first transmit power configuration, and/or the MT unit to transmit information at a transmit power indicated by the second transmit power configuration, where a sum of the transmit power of the DU and the transmit power of the MT unit is less than or equal to a maximum transmit power of the IAB node.

According to a third aspect, an embodiment of this application provides a base station, including a processor, a memory, and a computer program stored on the memory and executable on the processor. When the computer program is executed by the processor, the transmit power configuration method in the technical solution according to the first aspect is implemented.

According to a fourth aspect, an embodiment of this application provides a computer-readable storage medium, where the computer-readable storage medium stores a computer program. When the computer program is executed by a processor, the transmit power configuration method in the technical solution according to the first aspect is implemented.

BRIEF DESCRIPTION OF DRAWINGS

This application can be better understood from the following description of the embodiments of this application with reference to the accompanying drawings. In the accompanying drawings, the same or similar reference numerals denote the same or similar features.

DETAILED DESCRIPTION OF EMBODIMENTS

The technical solutions in the embodiments of this application are described below clearly with reference to the accompanying drawings in the embodiments of this application. Apparently, the embodiments described are some rather than all of the embodiments of this application. All other embodiments derived by persons of ordinary skill in the art based on the embodiments of this application fall within the scope of protection of this application.

Figure 1:
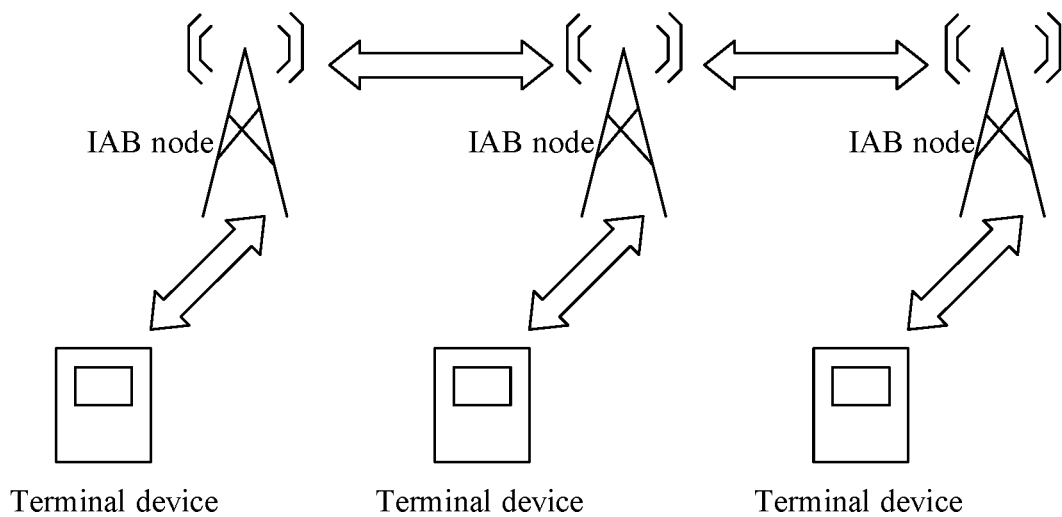
FIG. 1 is a schematic structural diagram of an example of an IAB system according to an embodiment of this application.

The embodiments of this application provide a transmit power configuration method, an IAB node, a base station, and a storage medium, which can be applied to an integrated access and backhaul (IAB) system. When a wired transmission network is not properly deployed in an IAB system, an IAB node may rely on wireless backhaul to implement information transmission. FIG. 1 is a schematic structural diagram of an example of an IAB system according to an embodiment of this application. As shown in FIG. 1, the IAB system includes a plurality of IAB nodes and a plurality of terminal devices. Each IAB node may access one or more terminal devices, which is not limited herein. An IAB node may correspond to a parent IAB node, and an IAB node may correspond to a child IAB node. In the three IAB nodes shown in FIG. 1, the second IAB node is a parent node of the first IAB node, and the third IAB node is a parent node of the second IAB node. An IAB node may be specifically implemented as a base station, which is not limited herein. A terminal device may be implemented as a mobile phone, a computer, a tablet computer, and another communications device, which is not limited herein.

Figure 2:
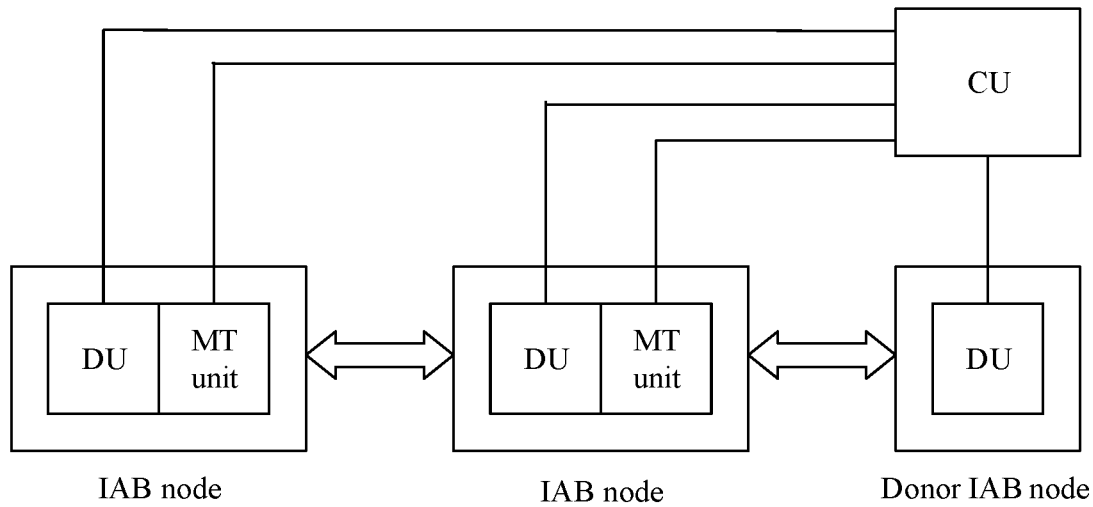
FIG. 2 is a schematic communication diagram of an example of an IAB node and a centralized unit according to an embodiment of this application.

An IAB node includes a distributed unit (DU) and a mobile termination (MT) unit. Through the MT unit, an IAB node can establish a wireless connection to a DU of a parent IAB node, so as to establish a backhaul link of the IAB node. It should be noted that an integrated access and backhaul loop includes a donor IAB node. The donor IAB node does not include an MT unit. FIG. 2 is a schematic communication diagram of an example of an IAB node and a centralized unit (CU) according to an embodiment of this application. As shown in FIG. 2, in an integrated access and backhaul loop, DUs of all IAB nodes are connected to one CU and are configured by the CU. MT units of all the IAB nodes are connected to the CU and are configured by the CU.

In some cases, an IAB node has only one radio frequency unit, such as a radio frequency (RF) device or a power amplifier (PA). To ensure no conflict between transmit powers of a DU and an MT unit in the IAB node, power sharing needs to be implemented between the DU and the MT unit. This application provides a transmit power configuration method, so as to implement power sharing between a DU and an MT unit of an IAB node, thereby improving communication performance of the IAB node.

Figure 3:
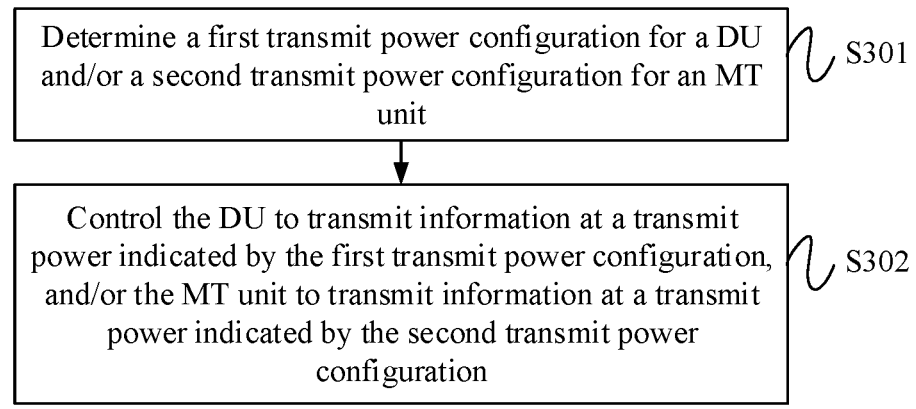
FIG. 3 is a flowchart of an embodiment of a transmit power configuration method according to this application.

This application provides a transmit power configuration method, which can be applied to an IAB node. FIG. 3 is a flowchart of an embodiment of a transmit power configuration method according to this application. As shown in FIG. 3, the transmit power configuration method includes step S301 and step S302.

In step S301, a first transmit power configuration for a DU and/or a second transmit power configuration for an MT unit are determined.

The first transmit power configuration is used to indicate a transmit power of the DU. The second transmit power configuration is used to indicate a transmit power of the MT unit.

In some examples, the IAB node may determine the first transmit power configuration for the DU and/or the second transmit power configuration for the MT unit according to the definition of a protocol.

In some other examples, the IAB node may determine the first transmit power configuration for the DU and/or the second transmit power configuration for the MT unit based on a configuration from an upstream node. The upstream node may be specifically a CU or a parent IAB node of the IAB node. If the upstream node is the parent IAB node of the IAB node, the parent IAB node transmits configuration information to the IAB node through radio resource control (RRC) signaling, F1-C signaling, or the like. The RRC signaling may include a system information block (SIB), user equipment specific radio resource control (UE-specific RRC), or the like.

In still some other examples, the IAB node may determine the first transmit power configuration for the DU and/or the second transmit power configuration for the MT unit based on configuration information for the DU and the MT unit of the IAB node.

In step S302, the DU is controlled to transmit information at a transmit power indicated by the first transmit power configuration, and/or the MT unit is controlled to transmit information at a transmit power indicated by the second transmit power configuration.

In some examples, the DU may transmit information at the transmit power indicated by the first transmit power configuration, and the MT unit may transmit information at the transmit power indicated by the second transmit power configuration.

In some other examples, the DU may transmit information at the transmit power indicated by the first transmit power configuration, and the MT unit may not transmit information at the transmit power indicated by the second transmit power configuration.

In still some other examples, the DU may not transmit information at the transmit power indicated by the first transmit power configuration, and the MT unit may transmit information at the transmit power indicated by the second transmit power configuration.

However, it should be noted that a sum of the transmit power of the DU and the transmit power of the MT unit is less than or equal to a maximum transmit power of the IAB node, so as to avoid a failure of the IAB node to support power transmission of the DU and the MT unit.

In this embodiment of this application, the IAB node determines the first transmit power configuration for the DU and/or the second transmit power configuration for the MT unit, so as to control the DU to transmit information at the transmit power indicated by the first transmit power configuration, and/or control the MT unit to transmit information at the transmit power indicated by the second transmit power configuration. The IAB node can configure transmit powers of the DU and the MT unit in advance, and the sum of the transmit power of the DU and the transmit power of the MT unit is less than or equal to the maximum transmit power of the IAB node, so as to implement power sharing between the DU and the MT unit of the IAB node and avoid a conflict between the transmit powers of the DU and the MT unit, thereby improving communication performance of the IAB node.

Figure 4:
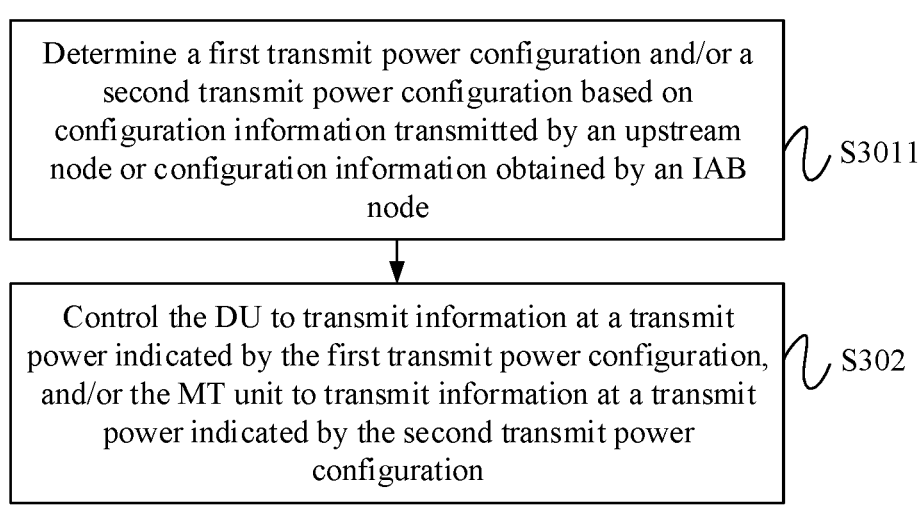
FIG. 4 is a flowchart of another embodiment of a transmit power configuration method according to this application.

FIG. 4 is a flowchart of another embodiment of a transmit power configuration method according to this application. A difference between FIG. 4 and FIG. 3 lies in that step S301 in FIG. 3 may be detailed as step S3011 in FIG. 4.

In step S3011, a first transmit power configuration and/or a second transmit power configuration are determined based on configuration information transmitted by an upstream node or configuration information obtained by the IAB node.

In some examples, the IAB node receives the configuration information transmitted by the upstream node, and determines the first transmit power configuration and/or the second transmit power configuration based on the configuration information. The upstream node includes a parent IAB node or a CU. Specifically, the parent IAB node or the CU may transmit the configuration information to the IAB node through RRC signaling or F1-C signaling.

The IAB node may further report transmit power reference information to the upstream node, so that the upstream node determines, based on the transmit power reference information, power resources to be allocated between the DU and the MT unit, and transmits the configuration information to the IAB node. Specifically, the transmit power reference information may include, but is not limited to, one or more of the following: a maximum expected transmit power of the DU, a minimum expected transmit power of the DU, a maximum expected transmit power of the MT unit, a minimum expected transmit power of the MT unit, an expected ratio of the maximum transmit power of the DU to the maximum transmit power of the MT unit, an expected difference between the maximum transmit power of the DU and the maximum transmit power of the MT unit, or a maximum transmit power of the IAB node.

In some other examples, the IAB node determines the first transmit power configuration and the second transmit power configuration based on the configuration information obtained by the IAB node. The IAB node may further report the obtained configuration information to the upstream node.

The configuration information in the foregoing embodiment may include, but is not limited to, one or more of the following: a maximum transmit power of the DU, a maximum transmit power of the MT unit, a ratio of the maximum transmit power of the DU to the maximum transmit power of the MT unit, a difference between the maximum transmit power of the DU and the maximum transmit power of the MT unit, a maximum energy per resource element (EPRE) of the DU, a maximum EPRE of the MT unit, a ratio of the maximum EPRE of the DU to the maximum EPRE of the MT unit, a difference between the maximum EPRE of the DU and the maximum EPRE of the MT unit, a maximum power spectral density (PSD) of the DU, a maximum PSD of the MT unit, a ratio of the maximum PSD of the DU to the maximum PSD of the MT unit, a difference between the maximum PSD of the DU and the maximum PSD of the MT unit, a minimum transmit power of the DU, a minimum transmit power of the MT unit, a ratio of the minimum transmit power of the DU to the minimum transmit power of the MT unit, a difference between the minimum transmit power of the DU and the minimum transmit power of the MT unit, a minimum EPRE of the DU, minimum EPRE of the MT unit, a ratio of the minimum EPRE of the DU to the minimum EPRE of the MT unit, a difference between the minimum EPRE of the DU and the minimum EPRE of the MT unit, a minimum PSD of the DU, a minimum PSD of the MT unit, a ratio of the minimum PSD of the DU to the minimum PSD of the MT unit, a difference between the minimum PSD of the DU and the minimum PSD of the MT unit, a configured transmit power of the DU, a configured transmit power of the MT unit, a ratio of the configured transmit power of the DU to the configured transmit power of the MT unit, or a difference between the configured transmit power of the DU and the configured transmit power of the MT unit.

In still some other examples, the configuration information determined by the IAB node includes a power reference parameter of the parent IAB node, a target receive power of the parent IAB node, and a total transmit power of the IAB node. The power reference parameter includes a reference signal received power (RSRP) or a path loss. For example, the MT unit of the IAB node may obtain, through measurement, the power reference parameter of the parent IAB node, the target receive power of the parent IAB node, and the total transmit power of the IAB node, and determines the second transmit power configuration for the MT unit based on the power reference parameter of the parent IAB node, the target receive power of the parent IAB node, and the total transmit power of the IAB node. For example, a mapping relationship between the power reference parameter and the maximum transmit power of the MT unit may be implemented by using a mapping table. The mapping table may be predefined, or may be sent to the IAB node by the CU or an operation and maintenance (O&M) server, which is not limited herein.

In some embodiments, the IAB node may control the MT unit to report a power headroom (Power Head Room, PHR) to the upstream node. The PHR reported to the upstream node is obtained based on the second transmit power configuration for the MT unit. For example, the PHR may be a difference or a ratio between a transmit power of the MT unit and a configured power of the MT unit. The configured power of the MT unit may be a maximum transmit power of the MT unit specified in a protocol, a maximum transmit power of the MT unit configured by the upstream node, a maximum transmit power of the MT unit determined by the IAB node, or a maximum transmit power of the MT unit reported by the MT unit, which is not limited herein.

In addition, there are a plurality of configured powers of the MT unit. Accordingly, the MT unit may transmit a plurality of PHRs to the upstream node, which correspond to different configured powers of the MT unit.

In some other embodiments, transmission priorities of the DU and the MT unit may be specified by a protocol or preconfigured. For example, the upstream node may configure the transmission priorities of the DU and the MT unit through RRC signaling or F1-C signaling. The transmission priority may include a priority of a unit and/or a priority of to-be-transmitted information.

For example, when the transmission priority includes a priority of a unit, if a priority of the DU is higher than that of the MT unit, a transmission priority of the DU is higher than that of the MT unit; and if a priority of the MT unit is higher than that of the DU, a transmission priority of the MT unit is higher than that of the DU.

For another example, when the transmission priority includes a priority of to-be-transmitted information, the transmission priorities of the DU and the MT unit are determined based on priorities of to-be-transmitted information of the MT unit and of to-be-transmitted information of the DU. The priority of to-be-transmitted information may be set based on specific operating scenarios and operating requirements, which is not limited herein. For example, the priorities of to-be-transmitted information in descending order are synchronization signal and PBCH block (SSB) information, physical random access channel (PRACH) information, physical downlink control channel (PDCCH) information/physical uplink control channel (PUCCH) information, and physical downlink shared channel (PDSCH) information/physical uplink shared channel (PUSCH) information. If information to be transmitted by the DU is PRACH information, and information to be transmitted by the MT unit is SSB information, the transmission priority of the MT unit is higher than that of the DU. For another example, a priority of information of an ultra reliable and low latency communications (URLLC) service is higher than that of information of an enhanced mobile broadband (eMBB) service. Service types of URLLC and eMBB may be distinguished by using a higher layer indication or a physical layer indication. For still another example, if a signal to be transmitted by the DU is a target signal, a priority of the target signal is higher than that of a non-target signal. The target signal includes but is not limited to one or more of an SSB signal, a common physical downlink control channel signal (Common PDCCH signal), a user equipment specific physical downlink control channel signal (UE-specific PDCCH signal), a channel state information reference signal (CSI-RS), or a tracking reference signal (TRS). Priorities of target signals may also be predefined by a protocol/configured by a control node.

If the transmission priority of the DU is higher than that of the MT unit, the IAB node preferentially controls the DU to transmit information at the transmit power indicated by the first transmit power configuration. The IAB node may further control the MT unit to perform power scaling or to discard the information. If the MT unit transmits the information at the transmit power indicated by the second transmit power configuration, which causes a failure of a radio frequency unit of the IAB node to meet the operating requirements, the MT unit is controlled to perform power scaling or to discard the information. The failure to meet the operating requirements may be that there is a large power difference or power spectral density difference between the MT unit and the DU. For example, if a difference between the total transmit power of the IAB node and the transmit power indicated by the first transmit power configuration is greater than or equal to the transmit power indicated by the second transmit power configuration, the MT unit is controlled to transmit the information at the transmit power indicated by the second transmit power configuration. If the difference between the total transmit power of the IAB node and the transmit power indicated by the first transmit power configuration is less than the transmit power indicated by the second transmit power configuration, the MT unit is controlled to perform power scaling or to discard the information.

If the transmission priority of the MT unit is higher than that of the DU, the IAB node preferentially controls the MT unit to transmit information at the transmit power indicated by the second transmit power configuration. The IAB node may control the DU to perform power scaling or to discard the information. If the DU transmits the information at the transmit power indicated by the first transmit power configuration, which causes a failure of a radio frequency unit of the IAB node to meet the operating requirements, the DU is controlled to perform power scaling or to discard the information. The failure to meet the operating requirements may be that there is a large power difference or power spectral density difference between the MT unit and the DU. For example, if a difference between the total transmit power of the IAB node and the transmit power indicated by the second transmit power configuration is greater than or equal to the transmit power indicated by the first transmit power configuration, the DU is controlled to transmit the information at the transmit power indicated by the first transmit power configuration. If the difference between the total transmit power of the IAB node and the transmit power indicated by the second transmit power configuration is less than the transmit power indicated by the first transmit power configuration, the DU is controlled to perform power scaling or to discard the information.

Transmission priorities of the target signal and the non-target signal may be further determined by a priority of a unit and a priority of to-be-transmitted information. For transmission of the target signal, its transmission priority is determined by the priority of to-be-transmitted information, and the priority of the target signal is higher than that of the non-target signal. The target signal includes but is not limited to one or more of an SSB signal, a common physical downlink control channel signal (Common PDCCH signal), a user equipment specific physical downlink control channel signal (UE-specific PDCCH signal), a channel state information reference signal (CSI-RS), or a tracking reference signal (TRS). Priorities of target signals may also be predefined by a protocol/configured by a control node. For transmission of the non-target signal, its transmission priority is determined by a priority of a unit.

Figure 5:
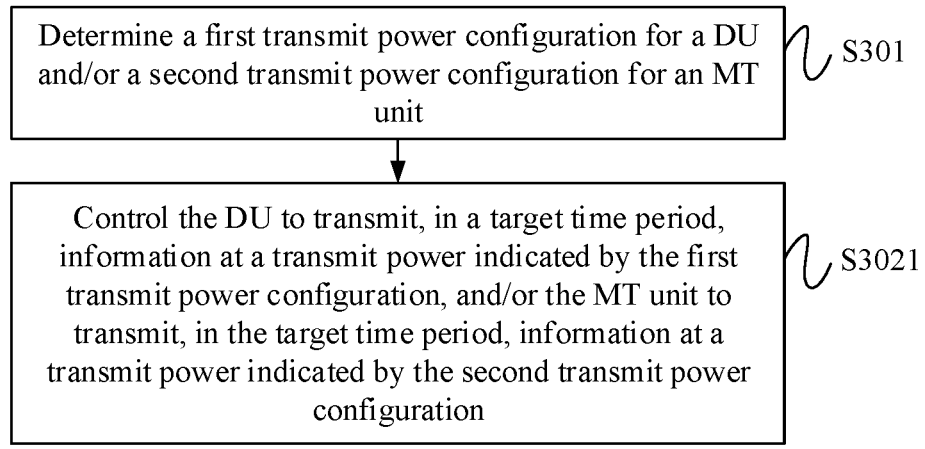
FIG. 5 is a flowchart of still another embodiment of a transmit power configuration method according to this application.

FIG. 5 is a flowchart of still another embodiment of a transmit power configuration method according to this application. A difference between FIG. 5 and FIG. 3 lies in that step S302 shown in FIG. 3 may be detailed as step S3021 shown in FIG. 5.

In step S3021, a DU is controlled to transmit, in a target time period, information at a transmit power indicated by a first transmit power configuration, and/or an MT unit is controlled to transmit, in the target time period, information at a transmit power indicated by a second transmit power configuration.

The target time period may include, but is not limited to, at least one of the following: a time period during which both the DU and the MT unit transmit information; a symbol or a symbol set occupied by a downlink resource configured for the DU and an uplink resource configured for the MT unit in time domain; a slot or a sub-slot containing in time domain the symbol occupied by the downlink resource configured for the DU and the uplink resource configured for the MT unit; or a slot set or a sub-slot set containing in time domain the symbol occupied by the downlink resource configured for the DU and the uplink resource configured for the MT unit.

In the foregoing embodiment, after the first transmit power configuration for the DU is determined, the downlink (DL) resource for the DU may be configured. After the second transmit power configuration for the MT unit is determined, the uplink (UL) resource for the MT unit may be configured. Accordingly, the DU transmits the information in the symbol or the symbol set occupied by the configured downlink resource, the slot or the sub-slot containing the symbol occupied by the downlink resource configured for the DU, or the slot set or the sub-slot set containing the symbol occupied by the downlink resource configured for the DU; and the MT unit transmits the information in the symbol or the symbol set occupied by the configured uplink resource, the slot or the sub-slot containing the symbol occupied by the uplink resource configured for the MT unit, or the slot set or the sub-slot set containing the symbol occupied by the uplink resource configured for the MT unit.

The slot set includes at least one slot. The sub-slot set includes at least one sub-slot. For example, the slot set includes a number of consecutive slots. The sub-slot set includes a number of consecutive sub-slots.

For example, a start time and a length of the symbol, symbol set, slot, sub-slot, slot set, or sub-slot set occupied by the downlink resource for the DU may be configured by an upstream node. The start time may be implemented by a relative start time and an offset. The length may be implemented by the number of symbols, slots, sub-slots, slot sets, or sub-slot sets. Specifically, the start time and the length may be configured through RRC signaling or F1-C signaling.

Figure 6:
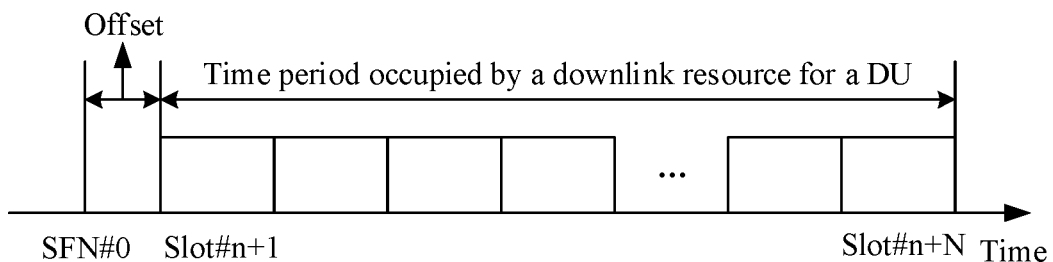
FIG. 6 is a schematic diagram of an example of a time period occupied by a downlink resource for a DU according to an embodiment of this application.

For example, FIG. 6 is a schematic diagram of an example of a time period occupied by a downlink resource for a DU according to an embodiment of this application. As shown in FIG. 6, a relative start time is SFN #0, an offset is offset, and a length is N slots, from Slot #n+1 to Slot #n+N.

With a time period occupied by a downlink resource configured for a DU and an uplink resource configured for an MT unit, a dynamic range in which the transmit power configurations for the DU and the MT unit take effect in time domain can be controlled.

In some examples, in a time period that is occupied by the downlink resource for the DU and the uplink resource for the MT unit and that is specified by a protocol or configured by an upstream node, the DU may be controlled to transmit information at the transmit power indicated by the first transmit power configuration, and the MT unit may be controlled to transmit information at the transmit power indicated by the second transmit power configuration. In other time periods, the transmit power of the DU and the transmit power of the MT unit are not subject to power sharing.

In some examples, within the time period that is occupied by the uplink resource or a flexible uplink/downlink resource for the MT unit and that is specified by a protocol or configured by the upstream node, the transmit power of the DU is less than or equal to a difference between a maximum transmit power of the IAB node and the maximum transmit power of the MT unit. In other time periods, the transmit power of the DU may be less than or equal to the maximum transmit power of the IAB node.

In the time period occupied by the downlink resource for the DU and the uplink resource for the MT unit in the foregoing embodiment, it is required to ensure that the transmit power of the DU and the transmit power of the MT unit remain stable.

In the foregoing embodiment, if a signal to be transmitted by the DU is a target signal, the DU may discard the target signal during the target time period. Alternatively, if the signal to be transmitted by the DU is a target signal, a transmit power of the target signal is the transmit power indicated by the first transmit power configuration. In other words, the DU transmits the target signal at the transmit power of the target signal indicated by the first transmit power configuration. The first transmit power configuration includes a power configuration for the target signal and a power configuration for a non-target signal. The power configuration for the target signal and the power configuration for the non-target signal may use independent power configurations or the same power configuration. For example, the transmit power of the target signal may be a transmit power when the DU uses a conventional information transmission method. Alternatively, the transmit power of the target signal may be a maximum transmit power of the DU.

The target signal is a specified special signal. For example, the target signal may include, but is not limited to, one or more of the following: an SSB signal, a common PDCCH signal, a UE-specific PDCCH signal, a CSI-RS, or a TRS.

In some examples, the IAB node may further report a resource position of the target signal to the upstream node. The resource position may be specifically a determined resource position or a potential resource position. The resource position may specifically include a time domain resource position and/or a frequency domain resource position, which is not limited herein. The IAB node reports the resource position of the target signal to the upstream node, so that when the upstream node configures powers for the DU and the MT unit of the IAB node, the upstream node can be prevented from configuring the MT unit to transmit information in a case where the DU transmits the target signal.

In some other embodiments, the IAB node may further transmit power indication information to a terminal device. The power indication information is used to indicate one or more of the following: whether the DU and the MT unit share a total transmit power of the IAB node, the transmit power of the DU and/or the MT unit, a difference between the transmit power of the DU and/or the MT unit and a reference power, a ratio of the transmit power of the DU and/or the MT unit to the reference power, a difference between the transmit power of the DU and the transmit power of the MT unit, or a ratio of the transmit power of the DU to the transmit power of the unit.

The reference power may be obtained based on the first transmit power configuration for the DU, which is not limited herein.

The power indication information may be carried in power execution signaling for transmission. Specifically, the power execution signaling may be physical layer signaling or higher layer signaling, for example, a media access control layer control element (MAC CE), or downlink control information (DCI), which is not limited herein.

The power indication information may assist the terminal device in adjusting AGC, and help the terminal device perform reference signal measurement and reference signal quality estimation.

The transmit power of the DU varies in different scenarios. Correspondingly, the terminal device performs an AGC adjustment. To reserve a time period for the terminal device to perform the AGC adjustment and avoid affecting communication between the IAB node and the terminal device, the IAB node may set a transitional time period when switching from a first scenario to a second scenario. The transitional time period is used for AGC adjustment by the terminal device communicating with the IAB node.

The first scenario may include one of the following: the DU transmits information and the MT unit performs no information transmission, the DU transmits information and the MT unit transmits information, the DU transmits information and the MT unit receives information, or the DU receives information and the MT unit transmits information.

The second scenario may include one of the following: the DU transmits information and the MT unit performs no information transmission, the DU transmits information and the MT unit transmits information, the DU transmits information and the MT unit receives information, or the DU receives information and the MT unit transmits information.

However, it should be noted that the first scenario is different from the second scenario.

A time period corresponding to the scenario in which the DU transmits information and the MT unit performs no information transmission is a time period in which a downlink resource for the DU has been configured for the DU but no resource has been configured for the MT unit. A time period corresponding to the scenario in which the DU transmits information and the MT unit transmits information is a time period in which a downlink resource has been configured for the DU and an uplink resource has been configured for the MT unit. A time period corresponding to the scenario in which the DU transmits information and the MT unit receives information is a time period in which a downlink resource has been configured for the DU and a downlink resource has been configured for the MT unit. A time period corresponding to the scenario in which the DU receives information and the MT unit transmits information is a time period in which an uplink resource has been configured for the DU and an uplink resource has been configured for the MT unit.

The IAB transmits specified information or stops information transmission during the transitional time period. The specified information is information specified by a protocol or preconfigured, which is not limited herein. For example, the specified information may be fixed sequence information, or information in a next time period, or any information transmitted by the DU.

In the foregoing embodiment, the IAB node may further report to the upstream node whether the DU and the MT unit share a radio frequency unit. For example, one information bit in the information may be used to indicate whether the DU and the MT unit share the same radio frequency unit.

Figure 7:
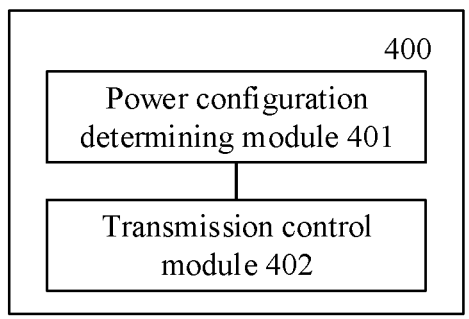
FIG. 7 is a schematic structural diagram of an embodiment of an IAB node according to this application.

This application further provides an IAB node, and the IAB node includes a DU and an MT unit. FIG. 7 is a schematic structural diagram of an embodiment of an IAB node according to this application. As shown in FIG. 7, the IAB node 400 includes a power configuration determining module 401 and a transmission control module 402.

The power configuration determining module 401 is configured to determine a first transmit power configuration for the DU and/or a second transmit power configuration for the MT unit.

The transmission control module 402 is configured to control the DU to transmit information at a transmit power indicated by the first transmit power configuration, and/or the MT unit to transmit information at a transmit power indicated by the second transmit power configuration.

A sum of the transmit power of the DU and the transmit power of the MT unit is less than or equal to a maximum transmit power of the IAB node.

In this embodiment of this application, the IAB node determines the first transmit power configuration for the DU and/or the second transmit power configuration for the MT unit, so as to control the DU to transmit information at the transmit power indicated by the first transmit power configuration, and/or control the MT unit to transmit information at the transmit power indicated by the second transmit power configuration. The IAB node can configure transmit powers of the DU and the MT unit in advance, and the sum of the transmit power of the DU and the transmit power of the MT unit is less than or equal to the maximum transmit power of the IAB node, so as to implement power sharing between the DU and the MT unit of the IAB node and avoid a conflict between the transmit powers of the DU and the MT unit, thereby improving communication performance of the IAB node.

Figure 8:
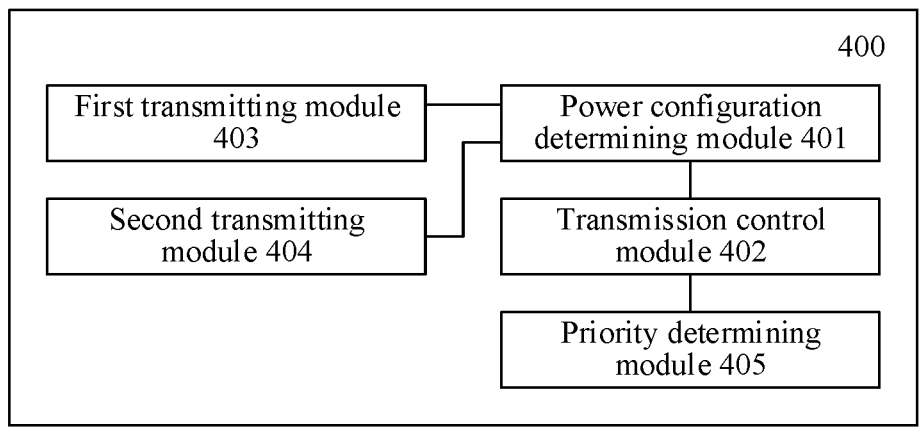
FIG. 8 is a schematic structural diagram of another embodiment of an IAB node according to this application.

FIG. 8 is a schematic structural diagram of another embodiment of an IAB node according to this application. A difference between FIG. 8 and FIG. 7 lies in that the IAB node shown in FIG. 8 may further include a first transmitting module 403, a second transmitting module 404, and a priority determining module 405.

The power configuration determining module 401 in the foregoing embodiment may be specifically configured to determine a first transmit power configuration and/or a second transmit power configuration based on configuration information transmitted by an upstream node or configuration information obtained by the IAB node.

The upstream node includes a parent IAB node or a CU.

The first transmitting module 403 is configured to report the configuration information obtained by the IAB node to the upstream node.

In some examples, the configuration information includes one or more of the following:

a maximum transmit power of the DU, a maximum transmit power of the MT unit, a ratio of the maximum transmit power of the DU to the maximum transmit power of the MT unit, a difference between the maximum transmit power of the DU and the maximum transmit power of the MT unit, a maximum energy per resource element of the DU, a maximum energy per resource element of the MT unit, a ratio of the maximum energy per resource element of the DU to the maximum energy per resource element of the MT unit, a difference between the maximum energy per resource element of the DU and the maximum energy per resource element of the MT unit, a maximum power spectral density of the DU, a maximum power spectral density of the MT unit, a ratio of the maximum power spectral density of the DU to the maximum power spectral density of the MT unit, a difference between the maximum power spectral density of the DU and the maximum power spectral density of the MT unit, a minimum transmit power of the DU, a minimum transmit power of the MT unit, a ratio of the minimum transmit power of the DU to the minimum transmit power of the MT unit, a difference between the minimum transmit power of the DU and the minimum transmit power of the MT unit, a minimum energy per resource element of the DU, a minimum energy per resource element of the MT unit, a ratio of the minimum energy per resource element of the DU to the minimum energy per resource element of the MT unit, a difference between the minimum energy per resource element of the DU and the minimum energy per resource element of the MT unit, a minimum power spectral density of the DU, a minimum power spectral density of the MT unit, a ratio of the minimum power spectral density of the DU to the minimum power spectral density of the MT unit, a difference between the minimum power spectral density of the DU and the minimum power spectral density of the MT unit, a configured transmit power of the DU, a configured transmit power of the MT unit, a ratio of the configured transmit power of the DU to the configured transmit power of the MT unit, or a difference between the configured transmit power of the DU and the configured transmit power of the MT unit.

In some other examples, the configuration information determined by the IAB node includes a power reference parameter of the parent IAB node, a target receive power of the parent IAB node, and a total transmit power of the IAB node. The power reference parameter includes a reference signal received power or a path loss.

In some examples, the transmission control module 402 in the foregoing embodiment may be further configured to control the MT unit to report a power headroom PHR to an upstream node.

The upstream node includes a parent IAB node or a CU. The PHR reported to the upstream node is obtained based on the second transmit power configuration for the MT unit.

The second transmitting module 404 is configured to report transmit power reference information to an upstream node.

The upstream node includes a parent IAB node or a CU.

In some examples, the transmit power reference information includes one or more of the following:

a maximum expected transmit power of the DU, a minimum expected transmit power of the DU, a maximum expected transmit power of the MT unit, a minimum expected transmit power of the MT unit, an expected ratio of the maximum transmit power of the DU to the maximum transmit power of the MT unit, an expected difference between the maximum transmit power of the DU and the maximum transmit power of the MT unit, or a maximum transmit power of the IAB node.

The priority determining module 405 is configured to determine transmission priorities of the DU and the MT unit.

If a transmission priority of the DU is higher than that of the MT unit, the transmission control module 402 controls the DU to transmit information at the transmit power indicated by the first transmit power configuration.

If a transmission priority of the MT unit is higher than that of the DU, the transmission control module 402 controls the MT unit to transmit information at the transmit power indicated by the second transmit power configuration.

In some examples, the transmission priority includes a priority of a unit and/or a priority of to-be-transmitted information.

Accordingly, if the transmission priority of the DU is higher than that of the MT unit, the transmission control module 402 is further configured to control the MT unit to perform power scaling or to discard the information. If the transmission priority of the MT unit is higher than that of the DU, the transmission control module 402 is further configured to control the DU to perform power scaling or to discard the information.

Figure 9:
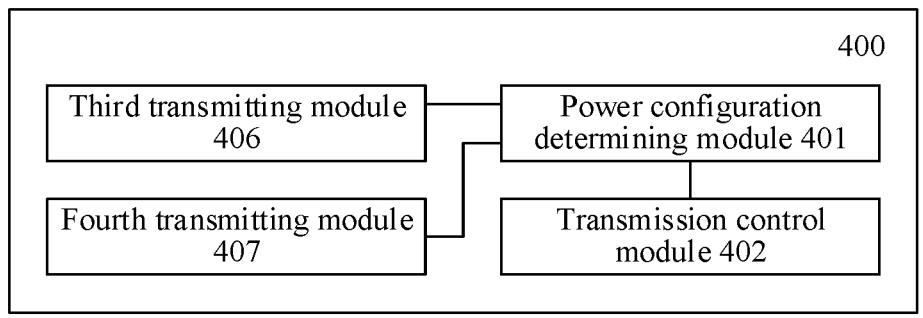
FIG. 9 is a schematic structural diagram of still another embodiment of an IAB node according to this application.

FIG. 9 is a schematic structural diagram of still another embodiment of an IAB node according to this application. A difference between FIG. 9 and FIG. 7 lies in that the IAB node shown in FIG. 9 may further include a third transmitting module 406 and a fourth transmitting module 407.

The transmission control module 402 in the foregoing embodiment is specifically configured to control a DU to transmit, in a target time period, information at a transmit power indicated by a first transmit power configuration, and/or an MT unit to transmit, in the target time period, information at a transmit power indicated by a second transmit power configuration.

The target time period includes at least one of the following: a time period during which both the DU and the MT unit transmit information; a symbol or a symbol set occupied by a downlink resource configured for the DU and an uplink resource configured for the MT unit in time domain; a slot or a sub-slot containing in time domain the symbol occupied by the downlink resource configured for the DU and the uplink resource configured for the MT unit; or a slot set or a sub-slot set containing in time domain the symbol occupied by the downlink resource configured for the DU and the uplink resource configured for the MT unit.

If a signal to be transmitted by the DU is a target signal, the target signal includes one or more of an SSB signal, a common PDCCH signal, a UE specific PDCCH signal, a CSI-RS, or a TRS.

The DU discards the target signal during the target time period. Alternatively, a transmit power of the target signal may be the transmit power indicated by the first transmit power configuration. The first transmit power configuration includes a power configuration for the target signal and a power configuration for a non-target signal.

The third transmitting module 406 is configured to report a resource position of the target signal to an upstream node, where the upstream node includes a parent IAB node or a CU.

The fourth transmitting module 407 is configured to transmit power indication information to a terminal device.

The power indication information is used to indicate one or more of the following: whether the DU and the MT unit share a total transmit power of the IAB node, the transmit power of the DU and/or the MT unit, a difference between the transmit power of the DU and/or the MT unit and a reference power, a ratio of the transmit power of the DU and/or the MT unit to the reference power, a difference between the transmit power of the DU and the transmit power of the MT unit, or a ratio of the transmit power of the DU to the transmit power of the unit.

Figure 10:
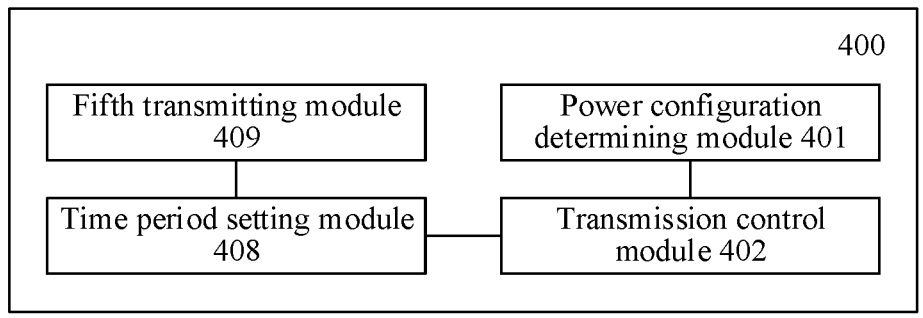
FIG. 10 is a schematic structural diagram of yet another embodiment of an IAB node according to this application.

FIG. 10 is a schematic structural diagram of yet another embodiment of an IAB node according to this application. A difference between FIG. 10 and FIG. 7 lies in that the IAB node shown in FIG. 10 may further include a time period setting module 408 and a fifth transmitting module 409.

The time period setting module 408 is configured to: when a first scenario is switched to a second scenario, set a transitional time period, where the transitional time period is used for automatic gain control adjustment by a terminal device communicating with the IAB node.

The first scenario includes one of the following: a DU transmits information and an MT unit performs no information transmission, the DU transmits information and the MT unit transmits information, the DU transmits information and the MT unit receives information, or the DU receives information and the MT unit transmits information. The second scenario includes one of the following: the DU transmits information and the MT unit performs no information transmission, the DU transmits information and the MT unit transmits information, the DU transmits information and the MT unit receives information, or the DU receives information and the MT unit transmits information. The first scenario is different from the second scenario.

The fifth transmitting module 409 is configured to transmit specified information or stop information transmission during the transitional time period.

Figure 11:
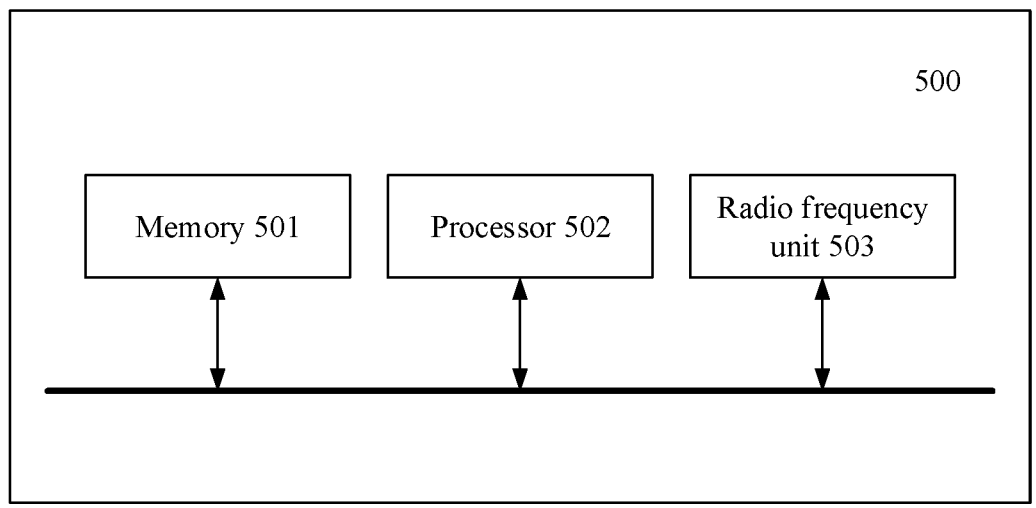
FIG. 11 is a schematic hardware structure diagram of an example of a base station that implements the embodiments of this application.

FIG. 11 is a schematic hardware structure diagram of an example of a base station that implements the embodiments of this application. As shown in FIG. 11, the base station 500 includes: a memory 501, a processor 502, a radio frequency unit 503, and a computer program stored on the memory 501 and executable on the processor 502. Persons skilled in the art may understand that the structure of the base station shown in FIG. 11 does not constitute a limitation to the base station. The base station may include more or fewer components than those shown in the figure, or some components may be combined, or there may be a different component arrangement.

The processor 502 is configured to determine a first transmit power configuration for the DU and/or a second transmit power configuration for the MT unit; and configured to control the DU to transmit information at a transmit power indicated by the first transmit power configuration, and/or the MT unit to transmit information at a transmit power indicated by the second transmit power configuration.

In FIG. 11, a bus architecture may include any number of interconnected buses and bridges, and link together one or more processors specifically represented by the processor 502 and various circuits of a memory represented by memory 501. The bus architecture may further link together various other circuits, such as a peripheral device, a voltage regulator, and a power management circuit, which are well known in the art and therefore are not further described herein. A bus interface provides an interface. The radio frequency unit 503 may be a plurality of elements, including a transmitter and a receiver providing a unit for communicating with various other apparatuses over a transmission medium, to receive and transmit data under the control of the processor 502. The processor 502 is responsible for managing the bus architecture and general processing, and the memory 501 may store data used by the processor 502 when performing an operation.

Optionally, an embodiment of this application further provides a base station, including a processor 502, a memory 501, and a computer program stored on the memory 501 and executable on the processor 502. When the computer program is executed by the processor 502, the processes of the foregoing transmit power configuration method embodiments applied to an IAB node shown in FIG. 3 to FIG. 5 are implemented, with the same technical effects achieved. To avoid repetition, details are not described herein again.

An embodiment of this application further provides a computer-readable storage medium. The computer-readable storage medium stores a computer program, and when the computer program is executed by a processor, the processes of the foregoing transmit power configuration method embodiments applied to an IAB node are implemented, with the same technical effects achieved. To avoid repetition, details are not described herein again. The computer-readable storage medium is, for example, a read-only memory (ROM for short), a random access memory (RAM for short), a magnetic disk, an optical disc, or the like.

The transmit power configuration method, the IAB node, the base station, and the storage medium in the foregoing embodiments can be applied to a 5G communications system and a later communications system, which is not limited herein.

The embodiments in this specification are described in a progressive manner, and the same or similar parts of the embodiments may refer to each other, and each embodiment focuses on a difference from another. For the IAB node embodiment, the base station embodiment, and the computer-readable storage medium embodiment, reference may be made to the description of the method embodiment for the related parts.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in the form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The various aspects of this application are described above with reference to the flowcharts and/or block diagrams of the method, the apparatus (system), and the computer program product according to the embodiments of this application. It should be understood that each block of the flowcharts and/or block diagrams and a combination of blocks of the flowcharts and/or block diagrams can be implemented by using programs or instructions. These programs or instructions may be provided to a processor of a general-purpose computer, a dedicated computer, or another programmable data processing apparatus to generate a machine, so that when these programs or instructions are executed by the processor of the computer or the another programmable data processing apparatus, the functions/actions specified in one or more blocks of the flowcharts and/or block diagrams can be implemented. Such a processor may be, but is not limited to, a general-purpose processor, a dedicated processor, a special application processor, or a field-programmable logic circuit. It may be further understood that each block in the block diagrams and/or the flowcharts, and a combination of the blocks in the block diagrams and/or the flowcharts may also be implemented by dedicated hardware that executes specified functions or actions, or may be implemented by a combination of dedicated hardware and computer instructions.

The embodiments of this application are described above with reference to the accompanying drawings, but this application is not limited to the foregoing specific implementations. The foregoing specific implementations are merely illustrative instead of restrictive. Under the enlightenment of this application, persons of ordinary skills in the art may make many forms without departing from the essence of this application and the scope of protection of claims, all of which fall within the protection of this application.

What is claimed is:

1. A transmit power configuration method, applied to an integrated access and backhaul IAB node, wherein the IAB node comprises a distributed unit DU and a mobile termination MT unit, and the method comprises:
determining a second transmit power configuration for the MT unit; and
controlling the MT unit to transmit information at a transmit power indicated by the second transmit power configuration, wherein
the determining a second transmit power configuration for the MT unit comprises:
determining the second transmit power configuration based on configuration information obtained by the IAB node;
wherein the configuration information comprises:
a maximum power spectral density of the MT unit, or
a minimum power spectral density of the MT unit;
the method further comprising:
when a first scenario is switched to a second scenario, setting a transitional time period, wherein the transitional time period is used for automatic gain control adjustment by a terminal device communicating with the IAB node; wherein
the first scenario comprises one of the following: the DU transmits information and the MT unit performs no information transmission, the DU transmits information and the MT unit transmits information, the DU transmits information and the MT unit receives information, or the DU receives information and the MT unit transmits information;
the second scenario comprises one of the following: the DU transmits information and the MT unit performs no information transmission, the DU transmits information and the MT unit transmits information, the DU transmits information and the MT unit receives information, or the DU receives information and the MT unit transmits information; and
the first scenario is different from the second scenario.

2. The method according to claim 1, further comprising:
reporting the configuration information obtained by the IAB node to a upstream node;
wherein the upstream node comprises a parent IAB node.

3. The method according to claim 1, wherein the configuration information further comprises one or more of the following:
a maximum transmit power of the MT unit, a ratio of the maximum transmit power of the DU to the maximum transmit power of the MT unit, a difference between the maximum transmit power of the DU and the maximum transmit power of the MT unit, a maximum energy per resource element of the MT unit, a ratio of the maximum energy per resource element of the DU to the maximum energy per resource element of the MT unit, a difference between the maximum energy per resource element of the DU and the maximum energy per resource element of the MT unit, a ratio of the maximum power spectral density of the DU to the maximum power spectral density of the MT unit, a difference between the maximum power spectral density of the DU and the maximum power spectral density of the MT unit, a minimum transmit power of the MT unit, a ratio of the minimum transmit power of the DU to the minimum transmit power of the MT unit, a difference between the minimum transmit power of the DU and the minimum transmit power of the MT unit, a minimum energy per resource element of the MT unit, a ratio of the minimum energy per resource element of the DU to the minimum energy per resource element of the MT unit, a difference between the minimum energy per resource element of the DU and the minimum energy per resource element of the MT unit, a ratio of the minimum power spectral density of the DU to the minimum power spectral density of the MT unit, a difference between the minimum power spectral density of the DU and the minimum power spectral density of the MT unit, a configured transmit power of the MT unit, a ratio of the configured transmit power of the DU to the configured transmit power of the MT unit, or a difference between the configured transmit power of the DU and the configured transmit power of the MT unit.

4. The method according to claim 1, wherein the configuration information determined by the IAB node comprises a power reference parameter of the parent IAB node, a target receive power of the parent IAB node, and a total transmit power of the IAB node, wherein
the power reference parameter comprises a reference signal received power or a path loss.

5. The method according to claim 1, further comprising:
controlling the MT unit to report a power headroom PHR to an upstream node, wherein the upstream node comprises a parent IAB node or a CU; and
the PHR reported to the upstream node is obtained based on the second transmit power configuration for the MT unit.

6. The method according to claim 1, further comprising:
reporting transmit power reference information to an upstream node, wherein the upstream node comprises a parent IAB node or a CU; and
the transmit power reference information comprises one or more of the following:
a maximum expected transmit power of the MT unit, a minimum expected transmit power of the MT unit, an expected ratio of the maximum transmit power of the DU to the maximum transmit power of the MT unit, an expected difference between the maximum transmit power of the DU and the maximum transmit power of the MT unit, or a maximum transmit power of the IAB node.

7. The method according to claim 1, wherein the controlling or the MT unit to transmit information at a transmit power indicated by the second transmit power configuration comprises:
controlling the MT unit to transmit, in a target time period, information at the transmit power indicated by the second transmit power configuration, wherein
the target time period comprises at least one of the following:
a time period during which both the DU and the MT unit transmit information;
a symbol or a symbol set occupied by a downlink resource configured for the DU and an uplink resource configured for the MT unit in time domain;
a slot or a sub-slot containing in time domain the symbol occupied by the downlink resource configured for the DU and the uplink resource configured for the MT unit; or
a slot set or a sub-slot set containing in time domain the symbol occupied by the downlink resource configured for the DU and the uplink resource configured for the MT unit.

8. The method according to claim 7, wherein if a signal to be transmitted by the DU is a target signal, the target signal comprises one or more of a synchronization signal and PBCH block SSB signal, a common physical downlink control channel Common PDCCH signal, a user equipment specific physical downlink control channel UE specific PDCCH signal, a channel state information reference signal CSI-RS, or a tracking reference signal TRS;
the DU discards the target signal during the target time period; or
a transmit power of the target signal is the transmit power indicated by the first transmit power configuration, wherein the first transmit power configuration comprises a power configuration of the target signal and a power configuration of a non-target signal.

9. The method according to claim 8, further comprising:
reporting a resource position of the target signal to an upstream node, wherein the upstream node comprises a parent IAB node or a CU.

10. The method according to claim 1, further comprising:
determining transmission priorities of the DU and the MT unit, wherein
if a transmission priority of the MT unit is higher than that of the DU, the MT unit is controlled to transmit information at the transmit power indicated by the second transmit power configuration.

11. The method according to claim 10, wherein
if the transmission priority of the DU is higher than that of the MT unit, the MT unit is controlled to perform power scaling or to discard the information.

12. The method according to claim 10, wherein the transmission priority comprises a priority of a unit and/or a priority of to-be-transmitted information.

13. The method according to claim 1, further comprising:
transmitting power indication information to a terminal device, wherein
the power indication information is used to indicate one or more of the following:
whether the DU and the MT unit share a total transmit power of the IAB node, the transmit power of the MT unit, a difference between the transmit power of the MT unit and a reference power, a ratio of the transmit power of the MT unit to the reference power, a difference between the transmit power of the DU and the transmit power of the MT unit, or a ratio of the transmit power of the DU to the transmit power of the unit.

14. The method according to claim 1, further comprising:
transmitting specified information or stopping information transmission during the transitional time period.

15. A base station, comprising a processor, a memory, and a program stored on the memory and executable on the processor, wherein when the computer program is executed by the processor, the processor is configured to:
determine a second transmit power configuration for the MT unit; and
control the MT unit to transmit information at a transmit power indicated by the second transmit power configuration, wherein
the determining a second transmit power configuration for the MT unit comprises:
determining the second transmit power configuration based on configuration information obtained by the IAB node;
wherein the configuration information comprises:
a maximum power spectral density of the MT unit, or
a minimum power spectral density of the MT unit;
further comprising:
when a first scenario is switched to a second scenario, setting a transitional time period, wherein the transitional time period is used for automatic gain control adjustment by a terminal device communicating with the IAB node; wherein
the first scenario comprises one of the following: the DU transmits information and the MT unit performs no information transmission, the DU transmits information and the MT unit transmits information, the DU transmits information and the MT unit receives information, or the DU receives information and the MT unit transmits information;
the second scenario comprises one of the following: the DU transmits information and the MT unit performs no information transmission, the DU transmits information and the MT unit transmits information, the DU transmits information and the MT unit receives information, or the DU receives information and the MT unit transmits information; and
the first scenario is different from the second scenario.

16. The base station according to claim 15, wherein the processor is further configured to report the configuration information obtained by the IAB node to a upstream node;
wherein the upstream node comprises a parent IAB node.

17. The base station according to claim 15, further comprising:
transmitting specified information or stopping information transmission during the transitional time period.

18. A non-transitory computer-readable storage medium, wherein the computer-readable storage medium stores a computer program, and the computer program, when executed by a processor, causes the processor to perform the following steps:
determining a second transmit power configuration for the MT unit; and
controlling the MT unit to transmit information at a transmit power indicated by the second transmit power configuration, wherein
the determining a second transmit power configuration for the MT unit comprises:
determining the second transmit power configuration based on configuration information obtained by the IAB node;
wherein the configuration information comprises:
a maximum power spectral density of the MT unit, or
a minimum power spectral density of the MT unit;
further comprising:
when a first scenario is switched to a second scenario, setting a transitional time period, wherein the transitional time period is used for automatic gain control adjustment by a terminal device communicating with the IAB node; wherein
the first scenario comprises one of the following: the DU transmits information and the MT unit performs no information transmission, the DU transmits information and the MT unit transmits information, the DU transmits information and the MT unit receives information, or the DU receives information and the MT unit transmits information;
the second scenario comprises one of the following: the DU transmits information and the MT unit performs no information transmission, the DU transmits information and the MT unit transmits information, the DU transmits information and the MT unit receives information, or the DU receives information and the MT unit transmits information; and
the first scenario is different from the second scenario.

* * * * *